Aug. 23, 1932.  R. W. BURNS  1,873,818
CLAMP MACHINE
Filed Nov. 7, 1929  4 Sheets-Sheet 1
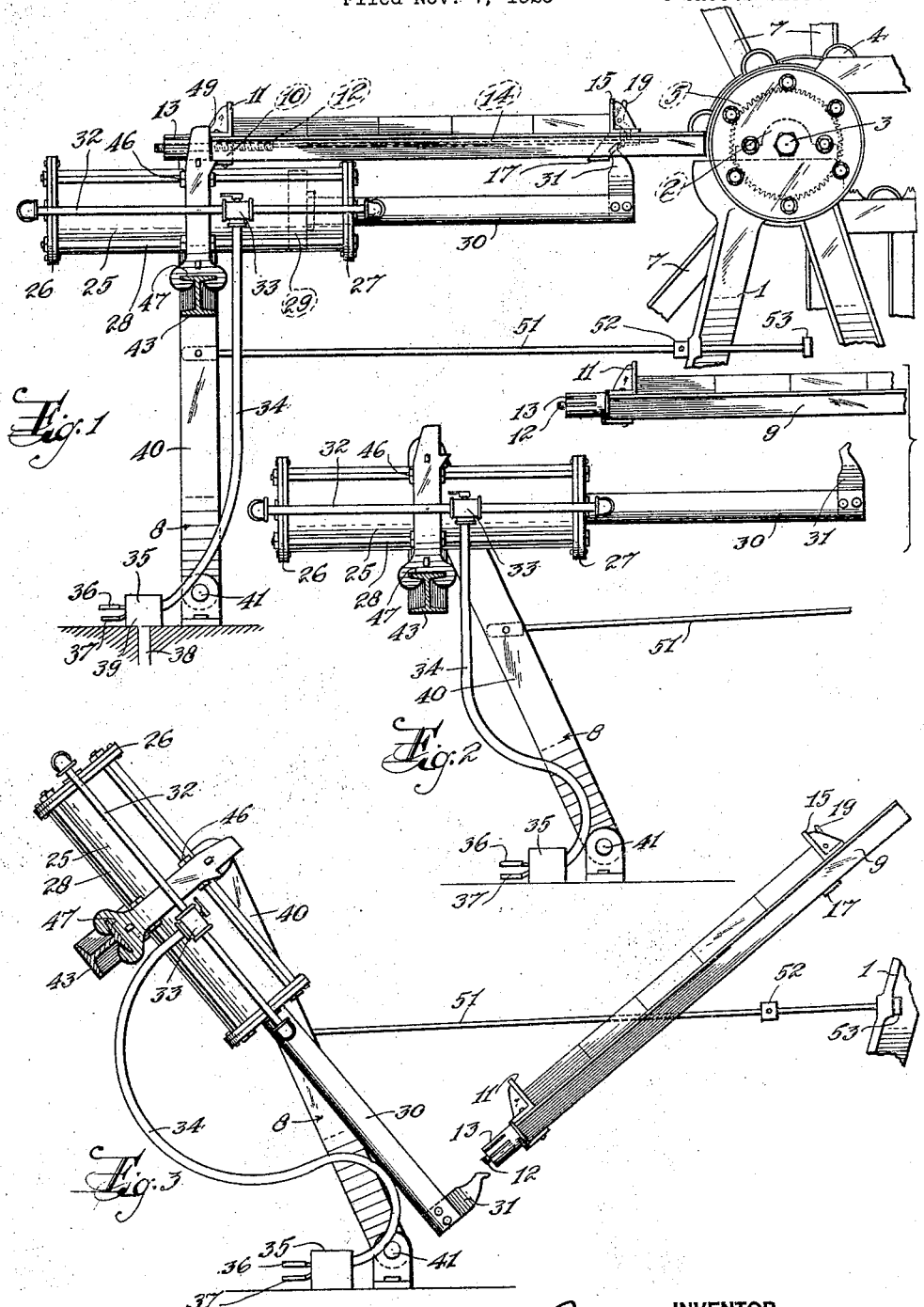

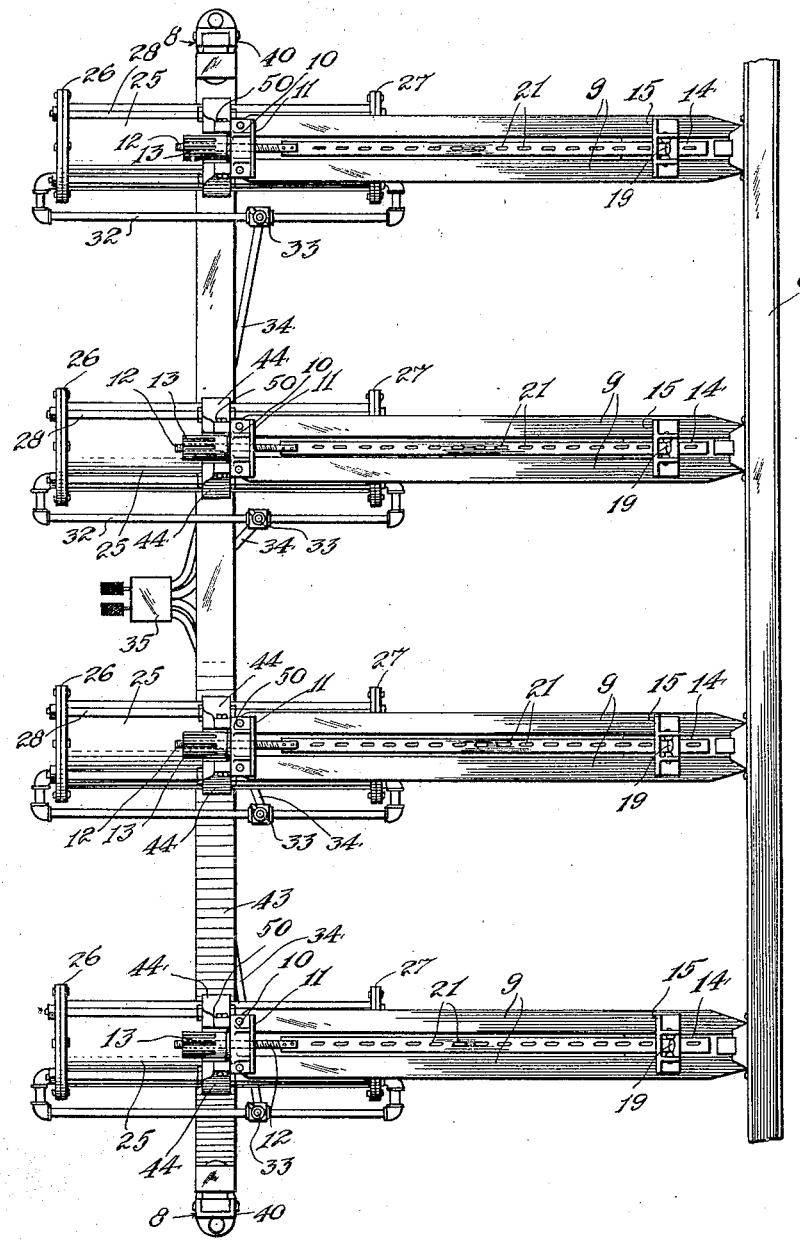

Aug. 23, 1932.    R. W. BURNS    1,873,818
CLAMP MACHINE
Filed Nov. 7, 1929    4 Sheets-Sheet 3
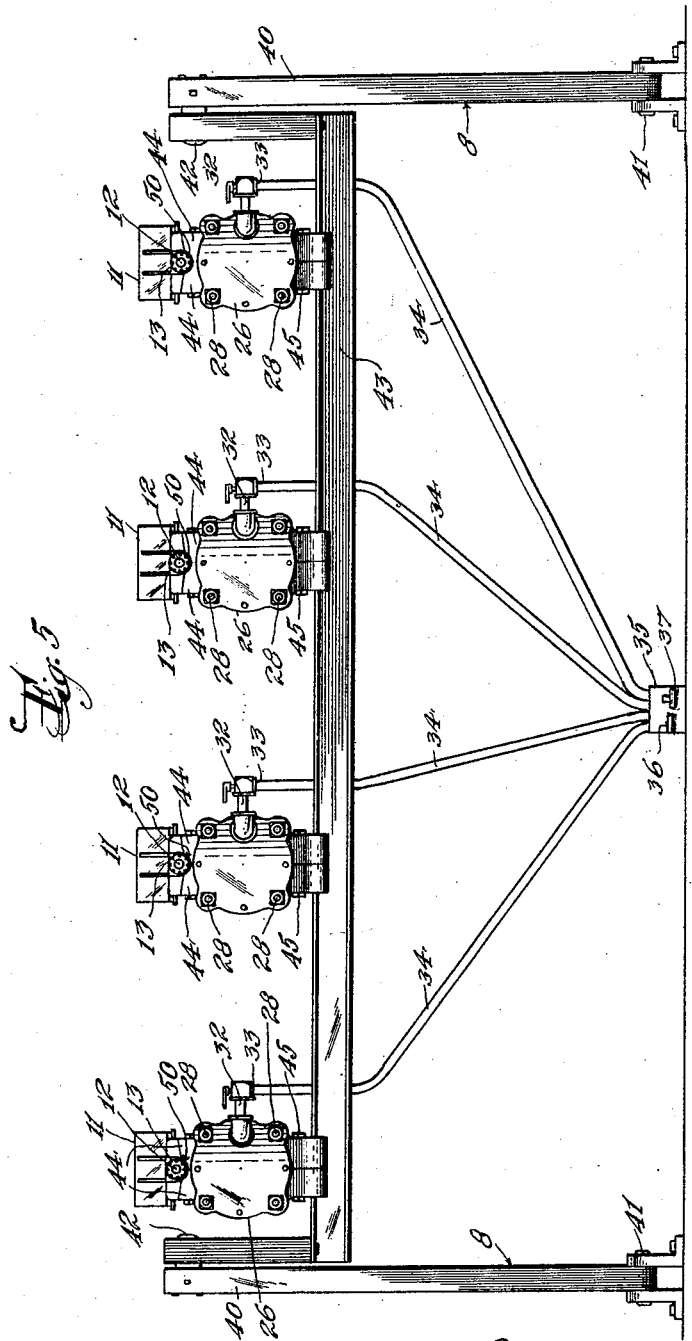
INVENTOR
Raymond W. Burns,
BY
ATTORNEYS

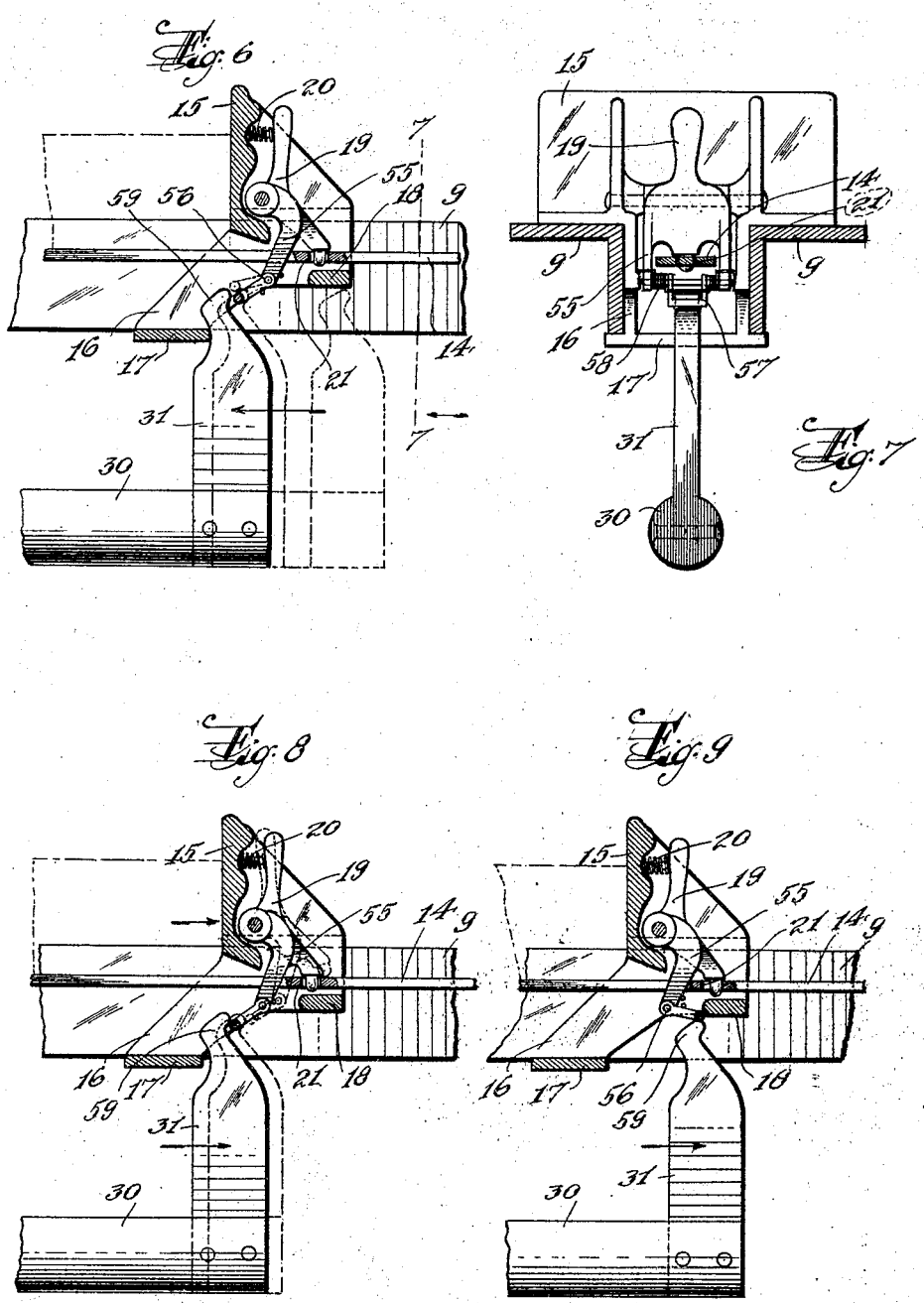

Patented Aug. 23, 1932

1,873,818

UNITED STATES PATENT OFFICE

RAYMOND W. BURNS, OF POUGHKEEPSIE, NEW YORK

CLAMP MACHINE

Application filed November 7, 1929. Serial No. 405,348.

This invention relates to clamping machines particularly designed for clamping strips or pieces of work to be glued together, the machine comprising a plurality of clamps which are movable to present them successively at a point most convenient for removing the work clamped therein and replacing it with freshly glued work, at which point an operator is stationed; and more particularly the invention relates to power-operated mechanism for closing the clamp, i. e., actuating the jaws of the clamp together to clamp the work therebetween.

One object of the invention is to provide power-operated mechanism for operating the individual clamps of a clamp machine embodying novel and improved features of construction including a motor for moving one of the clamp jaws toward the other so as to exert the desired clamping pressure on the work easily and quickly and with a minimum of manual effort.

Another object is to provide a novel and improved combination of such power-operated clamp closing means and a clamp support for holding the clamps in loading and unloading position.

Other objects are to provide a machine of the character described including power means for opening the clamps; to provide power-operated means for closing the clamps including a motor constructed and mounted so as to be separably engageable with one of the jaws of the clamp to actuate the jaw toward the other jaw; to provide in such a clamp machine manually operated means for holding the first-mentioned jaw in and releasing it from work-clamping position; to provide a mounting for such power-operated means whereby said means can be easily and quickly placed in and removed from operative relation to a clamp so as to permit closing of the clamp and subsequent movement thereof on the clamp machine past the power-operated closing means; to provide apparatus of this character which is relatively simple and inexpensive in construction and operation, and to obtain other advantages and results as will be more fully brought out by the following description.

Referring to the accompanying drawings, in which corresponding and like parts are designated throughout the several views by the same reference characters, Figure 1 is a side elevation of power-operated means for closing the clamps of a known type clamp machine, showing the mounting means in vertical section and a known type of clamping machine fragmentarily, the power-operated closing means being shown in operative relation to a clamp;

Figure 2 is a similar view showing the first step in the movement of the power-operated means into an out-of-the-way position with respect to the clamp so as to permit the clamp to pass the closing means;

Figure 3 is a similar view showing the clamp closing means moved entirely out of the way of the clamp;

Figure 4 is a top plan view of the power-operated clamp closing means and its mounting;

Figure 5 is an end elevation thereof;

Figure 6 is an enlarged vertical longitudinal sectional view through the clamp, showing the manner in which the power-operated means cooperates with the adjustable jaw;

Figure 7 is a transverse vertical sectional view on the line 7—7 of Figure 6, and Figures 8 and 9 are views similar to Figure 6, showing the manner in which the power-operated means releases the adjustable jaw and the manner in which the power-operated means disengages itself from the adjustable jaw, respectively.

For the purpose of explaining the principles of the invention, I have shown it in connection with a known clamping machine which includes a pair of supporting standards 1 having bearings 2 and a shaft 3 at each end of the machine, the standards of each pair being spaced and providing a passageway between themselves for endless carrier chains 4 which pass around the shafts 3 provided in the standards at the front and rear ends of the machine, wheels or drums 5 being mounted on the shafts for supporting said chains, and a cross-rod 6 extending from the middle of each link of one chain to the middle of the opposite link of the other chain, all of said rods remaining parallel as they are carried along by the chains.

Upon these rods of the successive links are mounted a plurality of series of clamping units each including a plurality or group of clamps 7, there being any desired number of clamps upon each rod transversely of the machine to cooperate with each other in receiving the work to be clamped.

One of the shafts 3 is power driven, for example as shown in my Patent No. 1,628,112, dated May 10, 1927, for moving the chains longitudinally of the machine to successively bring the clamps 7 into a convenient loading and unloading position where they are temporarily supported during the loading and unloading operation by a work support 8 pivotally mounted in any suitable manner, as upon the floor, to swing into and out of position beneath the clamps. In Figure 2 the support 8 is shown as swung out of supporting relation to the clamps to permit the latter to move downwardly and rearwardly away from the loading and unloading position. The clamps are so arranged on the chains 4 as to be disposed at angles of about 60° when they are passing over the drums or wheels 5, as shown in Figure 1, and each movement of the chains 4 is of a distance sufficient to carry the clamps through this 60° angle.

The clamps 7 may be generally of known construction and comprise a pair of angle bars 9, 9, arranged so that two of their flanges lie in parallel spaced relation to each other, while the other flanges project outwardly apart as shown in Figure 7 of the drawings. One end of each of the bars is secured to the rod 6, while to the opposite ends of the bars are secured a head 10 which comprises a body against the opposite sides of which lie the parallel flanges of the angle bars 9, 9. Above the other flanges, the head 10 provides a fixed jaw 11 to engage the work and which extends transversely across the body portion and work supporting flanges of the angle bars.

The body portion of the head is apertured below the jaw and between the angle bars 9, 9 so that a screw 12 may project therethrough to receive a clamping nut 13 rotatable but longitudinally immovable at the front of the head, the rear end of the screw being attached to a connecting draw bar 14 which extends backward between the angle bars of the clamp and is secured at its rear end to an adjustable jaw 15 overlying the angle bars transversely thereof and adapted to engage the opposite edge of the work from the fixed jaw 11. This adjustable jaw 15 sits upon the top flanges of the angle bars 9 and has arms 16, 16 extending forwardly downward between and adjacent the parallel flanges of the angle bars and connected at their lower ends by a cross-bar 17 having ledges to hook beneath the angle bars, all as clearly shown in Figures 6 and 7. Adjacent the jaw proper and at the back of the same, the arms 16, 16 are connected by a cross-piece 18 which serves as a rest for the connecting strip 14, and directly above said rest is the free end of a latch 19 pivoted to the back of the jaw proper and which is normally forced downward by a spring 20 into any one of a longitudinal series of apertures 21 in said strip 14, so as to secure the jaw in fixed relation to said strip. The latch 19 can be released by its handle and set at various points along the length of the connecting strip, according to the width of the work to be clamped, and the clamp is tightened against the work by means about to be described.

As shown in the drawings, there are four clamps in each series transversely of the machine, and for each clamp is provided a motor-operated means for actuating the adjustable jaw 15. These motors in the present instance are shown as identical and each comprising a cylinder 25 having heads 26 and 27 connected by tie rods 28. Within each cylinder 25 is reciprocable a piston 29 having a rod 30 extending from one end thereof at the extremity of which is a draw head 31 to engage the cross-bar 17 of the adjustable jaw for actuating said jaw toward the fixed jaw 11. These motors are supplied at their opposite ends with compressed air through pipes 32 controlled by valves 33, each pipe being supplied through a hose 34 and a valve mechanism 35 common to all of the motors which is preferably foot-controlled by means of pedals 36 and 37. This valve mechanism 35 may be of any suitable construction and operated so as to supply compressed air from a supply pipe 38 to one end of the motors upon depression of the pedal 36 and to the other end of the motors upon depression of the pedal 37. This valve of course includes suitable provision for exhausting the air from one end of the cylinder as the air is supplied to the other end.

These motors are mounted on the clamp support 8 which is shown as comprising two vertical standards 40 pivotally mounted at 41 at their lower ends to the floor or the like, and having suspended at their upper ends on pivots 42, a cradle which includes a horizontal I-beam 43. For mounting the motors upon this I-beam a bracket for each motor is provided and comprises two sections 44 formed to embrace the respective cylinders 25 and secured together in surrounding relation to the cylinder by bolts 45. These bracket sections 44 also have openings through which pass the tie rods 28 which are fast secured to the bracket by clamping nuts 46. The lower ends of the bracket sections are formed with transverse undercut grooves 47 to receive the top flanges of the I-beam 43, as clearly shown in Figure 1 of the drawings, so that the brackets may be slid longitudinally of the I-beam. At its upper end and at the side thereof adjacent the clamps, each bracket is provided with a shouldered seat 49 to receive the end of one clamp during the clamp unloading, loading and closing operation. The upper ends of the brackets are also formed with recesses 50 to provide a clearance for the clamping nuts 13.

In applying work to the clamps, the work support is disposed in substantially vertical position with the motors 25 substantially horizontal, as shown in Figure 1 of the drawings, and the clamps to be loaded are brought into a position with their outer ends resting in the shouldered seats 49. After the work has been arranged between the fixed jaw 11 and the adjustable jaw 15, compressed air is admitted to the motor cylinders by manipulation of the foot lever 36 controlling the valve 35. This causes the draw heads 31 of all of the motors to engage the cross-bars of the adjustable jaws 15 and slide the adjustable jaws to exert clamping pressure on the work. When sufficient pressure has been exerted on the work, the operator manually tightens each clamping nut 13 so as to hold the pressure on the work, after which the motors are actuated to move the draw heads 31 in the opposite direction away from the respective adjustable jaws by manipulation of the foot lever 37. Preferably the pitch of the thread on the screw 12 is steep so that slight rotation of the nut will cause considerable longitudinal movement thereof, whereby the tightening of the nut may be quickly accomplished.

It is now necessary to move the motors out of the way of the clamps so that the latter may continue their travel downwardly and around the clamp machine. To accomplish this, the support 8 is first tilted outwardly toward the operator as shown in Figure 2 of the drawings, and to limit this movement a check rod 51 may be provided which has stop collars 52 and 53 to engage the frame of the machine and limit movement of the support in both directions. Then the cradle is tilted upwardly, which swings the motors into inclined position as shown in Figure 3 of the drawings; and in this position the clamps may freely pass the motors as will be evident from an inspection of Figure 3 of the drawings.

After the clamps have traversed the clamping machine, they return to the unloading position, and to receive the clamps the support 8 is swung back to its initial position shown in Figure 1 so that the clamps may be brought to rest with their outer ends upon the shouldered seats 49. Thereupon the operator unscrews the nuts 13 to relieve the pressure on the work, and this can be facilitated by temporarily exerting pressure on the work by the power operated means to reduce friction against manual turning of the nuts. It is another feature of the invention to provide means for moving the adjustable jaws away from the work by power, and as shown in the drawings this means consists in providing the latch 19 with an inverted U-shaped extension 55 between the arms of which on a pivot rod 56 is mounted a U-shaped trip member 57. This trip member is normally in the path of movement of the end of the draw head 31, and is so held by torsional helical springs 58 connected between the arms of the U-shaped extension 55 and the trip member. The torsion of the springs is such that as the draw head is moved into engagement with the adjustable jaw, the trip member 55 will be displaced out of the path of the draw head, and the draw head is shown with an inclined upper end 59 to facilitate this movement, as shown in Figure 6 of the drawings. The torsion is also such that when the clamping nut 13 has been released, upon movement of the draw head away from the adjustable jaw, the trip member will resist such movement sufficiently to cause displacement of the latch 19 from the corresponding aperture 21 in the draw bar, as shown in Figure 8 of the drawings, and permit the adjustable jaw 15 to be moved away from the work by power. However, when the clamping nuts 13 are drawn up tight, as when the work is placed under compression by the motors, when the draw head is moved away from the adjustable jaw to disconnect the motor therefrom, the springs 58 will yield under the influence of the draw head as shown in Figure 9 of the drawings, so as to clear the draw head from the adjustable jaw. This action takes place just prior to the swinging of the motors out of the path of the loaded clamp before the latter starts on its movement around the clamp machine.

While I have shown and described the invention as embodied in certain details of construction, it will be understood that this is primarily for the purpose of illustrating the principles of the invention, and that many modifications and changes may be made in the details of construction without departing from the spirit and scope of the invention

Having thus described the invention, what I claim is:

1. In a clamp machine, the combination of a frame, opposed jaws, a draw bar having a nut for operating it, a separable connection between one of said jaws and said draw bar so that said nut and draw bar hold said jaw in work-clamping relation to the other jaw, a motor, and means connecting said motor to the first-mentioned jaw to actuate the latter toward the other jaw upon movement in one direction.

2. In a clamp machine, the combination of a frame, opposed jaws, a draw bar having a nut for operating it, a separable connection between one of said jaws and said draw bar so that said nut and draw bar hold said jaw in work-clamping relation to the other jaw, a motor, means connecting said motor to the first-mentioned jaw to actuate the latter toward the other jaw upon movement in one direction, and means cooperating with said connecting means upon movement of the latter in the other direction when said nut is released to release said separable connection of the first-mentioned jaw to said draw bar and move the first-mentioned jaw by power away from the other jaw.

3. In a clamp machine, the combination of a frame, a pair of opposed jaws thereon, a motor, means for connecting said motor to one of said jaws for actuating said jaw toward the other jaw to clamp work therebetween, and manually operated means independent of said means connecting said motor to the first-mentioned jaw for holding said first-mentioned jaw in and releasing it from the work-clamping relation to the other jaw to which it has been actuated by said motor.

4. In a clamp machine, the combination of a frame, a pair of opposed jaws thereon, a motor, means for connecting said motor to one of said jaws for actuating said jaw toward the other jaw to clamp work therebetween, a screw connected to the first-mentioned jaw independently of said means connecting the first-mentioned jaw to said motor and slidable in said frame, and a manually operated nut on said screw to engage said frame and hold said first-mentioned jaw in and release it from the work-clamping relation to the other jaw to which it has been actuated by said motor.

5. In a clamp machine, the combination with a plurality of clamps, and means for moving clamps successively into and away from a predetermined point for loading and unloading, of a support at said point for holding said clamps in loading and unloading position and movable into and out of the path of movement of said clamps, and power-operated means mounted on said support and movable therewith to separably connect with and operate said clamps to clamp work therein.

6. In a clamp machine, the combination with a plurality of clamps, means for moving clamps successively into and away from a predetermined point for loading and unloading, each clamp including a frame, and opposed jaws, of a support at said point for holding said clamps in loading and unloading position and movable into and out of the path of movement of said clamps, and power-operated means mounted on said support and movable therewith to separably connect with and actuate one of said jaws to clamp work between said jaws.

7. The clamp machine set forth in claim 6 wherein said support has a seat for the clamps to relieve the latter of tensional strains during the clamping operation.

8. The clamp machine set forth in claim 6 wherein said support has a shouldered seat against which the other jaw of the clamp abuts during the clamping operation.

9. In a clamp machine, the combination of a frame, opposed jaws, a draw bar having a nut engaging one jaw for operating the draw bar, a spring-operated latch on the other jaw to connect it to said draw bar so that said nut and draw bar hold the second-mentioned jaw in work-clamping relation to the first-mentioned jaw, a power-operated means, means connecting said power-operated means to said second mentioned jaw to actuate the latter toward the first-mentioned jaw upon movement in one direction, and means connected to said latch and engageable by the last-mentioned means upon movement of the latter in the other direction when said nut is released to both disconnect said latch from said draw bar and move the second-mentioned jaw away from said first-mentioned jaw.

10. The clamp machine set forth in claim 9 wherein the last-mentioned means is yieldable to permit disconnection thereof from the means connecting the power-operated means to the second-mentioned jaw when a predetermined resistance to movement of the latch obtains.

11. In a clamp machine, the combination of a frame, a pair of opposed jaws, a motor, means for separably connecting one of said jaws to said motor for actuating said jaw toward the other jaw and clamp work therebetween, and manually operated means independent of said means connecting said motor to the first-mentioned jaw for holding said first-mentioned jaw in and releasing it from work-clamping relation to the other jaw when said connecting means is disconnected from said first-mentioned jaw.

12. In a clamp machine, the combination of a clamping unit including a plurality of clamps each having a frame and a pair of opposed jaws, said frames being disposed in a common plane to cooperate in receiving work to be clamped and each pair of jaws to independently clamp the work, a motor for each clamp, means for separably connecting each motor to one of said jaws of the respective clamp to actuate said jaw toward the other jaw and clamp work therebetween, and a support to separably receive each said frame and relieve it of tensional strains during the clamping operation.

13. In a clamp machine, the combination of a clamping unit including a plurality of clamps each having a frame and a pair of opposed jaws, said frames being disposed in a common plane to cooperate in receiving work to be clamped and each pair of jaws to independently clamp the work, a motor for each clamp, means for separably connecting each motor to one of said jaws of the respective clamp to actuate said jaw toward the other jaw and clamp work therebetween, and means manually operated on each clamp frame for holding the corresponding first-mentioned jaw in and releasing it from the work clamping relation to the other jaw to which it has been actuated by said motor, whereby said clamp unit can be brought to the motor, the work clamped therein, the clamp unit can be removed from the motor with the work held under the full compression applied by the motor, and the work manually released from the clamp unit when desired.

14. A clamp machine having a plurality of clamping units each identical with the clamping unit set forth in claim 13, and with the addition of means for successively moving said clamping units into and from cooperating relation to said motors.

15. The clamp machine set forth in claim 13 wherein each of said motors is a fluid pressure motor, and with the addition of means common to all of said motors for controlling supply of fluid pressure simultaneously to said motors.

16. In a clamp machine, the combination of a clamping unit including a plurality of clamps each having a frame and a pair of opposed jaws, said frames being disposed in a common plane to cooperate in receiving work to be clamped and each pair of jaws to independently clamp the work, power driven means for said clamps, means for separably connecting said power driven means to one of said jaws of each clamp to actuate said jaw toward the other jaw and clamp work therebetween, and means manually operated on each clamp frame for holding the corresponding first-mentioned jaw in and releasing it from the work clamping relation to the other jaw to which it has been actuated by said power driven means, whereby said clamp unit can be brought to the power driven means, the work clamped therein, the clamp unit can be removed from the power driven means with the work held under the full compression applied by the power driven means, and the work manually released from the clamp unit when desired.

RAYMOND W. BURNS.